(12) United States Patent
Meuwissen et al.

(10) Patent No.: US 7,083,696 B2
(45) Date of Patent: Aug. 1, 2006

(54) LAMINATED SHEETING AND METHOD OF MANUFACTURE

(75) Inventors: Hubertus Emmanuel Joannes Marie Meuwissen, Nieuwstadt (NL); Ferdinand Bernhard Wilhelm Aquina, Weert (NL)

(73) Assignee: Euramax Coated Products B.V., Roermond (NL)

( * ) Notice: Subject to any disclaimer, the term of this patent is extended or adjusted under 35 U.S.C. 154(b) by 0 days.

(21) Appl. No.: 10/943,100

(22) Filed: Sep. 17, 2004

(65) Prior Publication Data

US 2006/0063022 A1 Mar. 23, 2006

(51) Int. Cl.
*B29C 63/00* (2006.01)
*B29C 65/00* (2006.01)
*B32B 37/02* (2006.01)
*B32B 38/08* (2006.01)
*B05D 3/02* (2006.01)

(52) U.S. Cl. .................. 156/166; 156/184; 156/272.2; 427/328; 427/388.1

(58) Field of Classification Search ................ 156/166, 156/184, 272.2, 278; 264/494, 495, 172.19; 427/327, 328, 372.2, 385.5, 388.1, 389.8, 427/407.3, 428.01
See application file for complete search history.

(56) References Cited

U.S. PATENT DOCUMENTS 6,149,971 A * 11/2000 Lusardi ...................... 427/195

FOREIGN PATENT DOCUMENTS

EP 001344640 A2 * 9/2003

* cited by examiner

*Primary Examiner*—Michael E. La Villa
(74) *Attorney, Agent, or Firm*—Ben Bedi, Esq.; Dechert LLP

(57) ABSTRACT

A laminated sheeting and method for making the sheeting. The sheeting is a metal composite sheeting with a single metal sheet. The sheeting is relatively lightweight and inexpensive and can manufactured rapidly in a continuous process. The sheeting is especially designed for use in applications requiring lightweight materials such as finish for vehicles, trailers, caravans, and buildings.

13 Claims, 2 Drawing Sheets

LAMINATED SHEETING AND METHOD OF MANUFACTURE

BACKGROUND

1. Field of the Invention

This invention relates to composite materials.

2. Related Art

Composites are fiber-reinforced engineering structural materials, in which the fibers are continuous or long enough that they can be oriented to produce enhanced strength properties in one direction. Composites are made of a fiber component and a plastic or resin component. A common generic example of a composite is fiberglass. The principal driving force that led to the interest and investment in composite materials in the mid-1950s and 1960s was the demand for lower weight and higher rigidity for aerospace structures, electronics, sports equipment, and other applications. Composites are generally lighter than metals and can have similar structural properties to metals. Thus, composites are used as substitutes for metals in many applications especially in applications where lightweight materials are desired such as tennis rackets and sailboards.

However, composites are not generally suited for sheeting applications. Sheeting applications generally require smooth bendable materials that are also lightweight. Due to the desire for lightweight materials that are also smooth and formable, metal composites were developed. Metal composites are made of a metal component, a fiber component, and a resin component.

Metal composite sheeting is commonly used in applications where there is a desire to provide a light weight material covering such as paneling for a caravan. Methods for forming such metal composite sheeting are also known. For example, Sanadres et al., published U.S. application Ser. No. 2003/0031853, describes a method for manufacturing a laminated sheeting. The method includes unrolling a roll of resin impregnated textile between two metal sheets. The metal sheets are unrolled from respective metal sheet rollers. Thereupon, the impregnated textile core is heated between the two metal sheets for the purpose of curing the resin. However, sheeting containing two metal layers is relatively heavy and expensive. This renders the sheeting less suitable for use as finish for vehicles, trailers, caravans, and buildings. Although an improvement over a batch process, the method of Sanadres et al. is also relatively time consuming, which increases the production costs of the sheeting.

Flexible printed circuit boards have been manufactured in a similar manner using only one sheet of metal. For example, Zachariades, U.S. Pat. No. 3,810,816, teaches providing a fiber reinforced resin, a copper sheet, and a mylar cover layer onto a roller, rolling the tri-layer film under tension to eliminate entrapped air, and curing the resin. However, circuit boards require a whole different scale and entirely different properties compared to sheeting material.

Meuwissen et al., NL1020184, teaches a method for forming a laminated sheeting comprising rolling an aluminum layer and a fiber reinforced resin together on a roller; compacting the layers together through a series of press-on rollers; curing the compacted layers with UV-lamps; and rolling the completed laminate for storage and transport. However, Meuwissen et al. does not detail a pretreatment process for the aluminum layer. Thus, there is a need for an improved composite sheeting and method of manufacture comprising a single metal sheet layer wherein the sheeting demonstrates enhanced adherence of a fiber reinforced plastic layer to a metal sheet and enhanced corrosion resistance.

SUMMARY

One embodiment of the invention is a sheeting comprising a single metal sheet layer with a topside and a backside. A barrier layer covers the metal sheet on both sides. On the topside, a finishing layer covers the barrier layer and a protective film covers the finishing layer. On the backside, an interlayer adhesion layer covers the barrier layer and a fiber reinforced plastic layer covers the interlayer adhesion layer. The fiber reinforced plastic layer can include one or more fibrous webs and a curable resin.

Another embodiment of the invention is a method for forming a composite sheeting. The method comprises a pretreatment process and a lamination process. In a first step, the topside and a backside of a metal sheet are degreased. A barrier layer is then applied to both sides of the degreased metal sheet. A finishing layer is then applied over the barrier layer on the topside of the metal sheet and an interlayer adhesion layer is applied over the barrier layer on the backside of the metal sheet. The finishing layer and the interlayer adhesion layer are subsequently cured. A protective film is then applied to the topside of the metal sheet over the cured finishing layer to form a pretreated metal sheet. The pretreated metal sheet is then coiled on a metal sheet supply roller. This completes the pretreatment of the metal sheet. In a laminating process, the pretreated metal sheet is unrolled from the metal sheet supply roller. A glass fibrous web is unrolled from a glass fibrous web supply roller and the glass fibrous web is saturated with a resin to form a saturated glass fibrous web. The saturated glass fibrous web is then applied to the backside of the pretreated metal sheet. The resin is then cured to form a dent resistant sheeting with a fiber reinforced plastic layer and only one metal sheet.

The invention will now be described in details with reference to the figures. The figures are not drawn to scale and are only pictorial representations. They are meant in no way to limit the scope or breadth of the invention. The invention is only defined and limited by the appended claims

DETAILED DESCRIPTION

Sheeting

Figure 1:
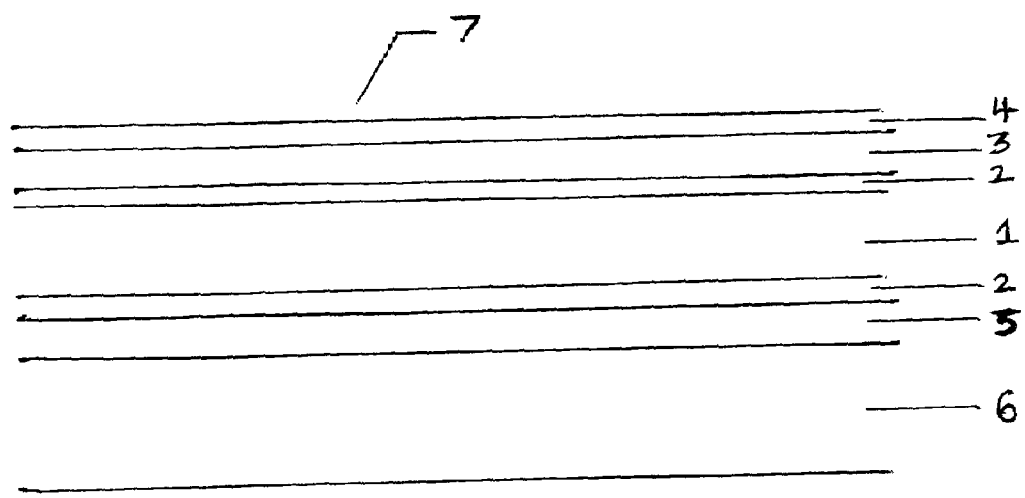
FIG. 1 depicts a cross section of a sheeting.

In FIG. 1, a cross section of a sheeting 7 is represented. The sheeting 7 comprises one metal sheet 1 having a topside and a backside. On the topside, the metal sheet is provided with a barrier layer 2, a finishing layer 3, and a protective film 4. On the backside, the metal sheet is provided with a barrier layer 2, an interlayer adhesion layer 5, and a fiber reinforced plastic layer 6.

The metal sheet is preferably a layer of aluminum or an aluminum alloy. The metal sheet is most preferably at least about 90% by weight aluminum and may contain other metals such as silicon, iron, copper, manganese, magnesium, chromium, nickel, zinc, titanium, and gallium. Other metals that can be used as the metal sheet are iron, copper, and their alloys. The metal sheet has a thickness of between about 0.3 and about 1.0 mm. Preferably, the thickness of the metal sheet is between about 0.4 and about 0.6 mm. The fiber reinforced plastic layer is made up of one or more fibrous webs and a cured resin. In embodiments with more than one fibrous webs, the webs are stacked over each other with resin throughout the fiber reinforced plastic layer. The webs can be any of a woven carbon web, a fibrous cloth, or a chopped stranded glass thread. The resin used is preferably a liquid, curable synthetic resin. More preferably, the resin can be any of a polyester, acrylate, epoxy, polyurethane, phenol, vinyl based resin, or the like. Most preferably, the resin is a polyester based resin. The resin also has a relatively low shrinkage after curing, preferably a shrinkage of less than about 8%. The resin can also contain different basic and/or filler materials. Preferably, the resin contains a curing agent, such as for instance a UV-light curer or a heat curer, for rapidly curing the resin. Most preferably, the resin contains a heat curing agent.

The at least one fiber reinforced plastic layer has a thickness of between about 0.5 and about 1.5 mm. The ratio of the layer thicknesses of the at least one fiber reinforced plastic layer and the metal layer is between about 1:3 and about 3:1. The at least one fiber reinforced plastic layer has a mass density of between about 0.8 and about 1.5 kg/m$^2$. This mass density depends on the amount of fibrous material present in the plastic layer and the composition of the resin used for the plastic layer. The fiber to resin ratio by weight is between about 1:2 and about 1:5 and preferably about 1:4. Preferably, the fiber reinforced plastic layer has substantially the same temperature expansion coefficient as the metal sheet, so that warping of the sheeting under the influence of temperature fluctuations is prevented.

The barrier layer can be an elemental metal coating or a metal oxide coating. The metal can be chrome (VI), chrome (III), titanium, zirconium, or the like. Preferably, the barrier layer comprises chrome (VI). The barrier layer protects the metal sheet from corrosion and improves adhesion between the metal sheet and the finishing layer. The barrier layer is preferably less than about 1 μm thick. The finishing layer can be any of a polyester, polyacrylate, polyurethane, polyurethane polyamide, polyvinylidene fluoride coating, or the like. Preferably, the finishing layer is a polyester coating. The finishing layer protects the metal sheet from corrosion and provides the sheeting with a high gloss finish. The finishing layer also renders the sheeting scratch resistant. In addition, the finishing layer can provide the sheeting surface with a desired color. The finishing layer can also provide the surface of the sheeting with an image such as a text, figure, decoration, and/or logo. The finishing layer is between about 19 and about 23 μm thick. The finishing layer is preferably about 21 μm thick. The interlayer adhesion layer is comprised of a polyester epoxy blend and has a thickness of between about 13 and about 17 μm. The interlayer adhesion layer may also comprise pigments for corrosion protection. The interlayer adhesion layer ensures that the metal sheet and the at least one fiber reinforced plastic layer are held together tightly. The protective layer is preferably low density polyethylene although other materials can be used. The protective layer has a thickness of between about 35 and about 100 μm and preferably the thickness is between about 50 and about 80 μm. The protective layer serves to protect the finishing layer from scratching and other damage during transport and installation of the sheeting. The protective layer is removed upon installation of the sheeting.

Method of Fabrication

The method for forming the composite sheeting will now be described. The method is made up of two primary processes, a pretreatment process and a lamination process. The pretreatment process is a process wherein the metal sheet is treated and coated prior to being coiled. The lamination process is a process wherein the pretreated metal sheet is joined to at least one resin saturated fibrous web to form the sheeting. Both the pretreatment process and the lamination process are continuous processes.

Pretreatment Process

A metal sheet is first subjected to a degreasing process. The degreasing process can include an acid spray system, an alkali spray system, a rinse system, or a non-rinse system. Preferably, the degreasing process includes subjecting the metal sheet to an acid spray system. The metal sheet is then rinsed with water and a barrier layer is applied to each side of the metal sheet. The barrier layer can applied by rinse coating, spraying, or roll coating. Preferably, the barrier layer is applied by roll coating. The metal sheet is then cleaned with de-mineralized water and subsequently dried.

A finishing layer is then applied to the topside of the metal sheet and an interlayer adhesion layer is applied to the backside of the metal sheet. Both of these layers can be applied by roll coating, spraying, or powder coating. Preferably, roll coating is used. The interlayer adhesion layer can be applied in one or more than one layer to reach the desired thickness. The finishing layer is applied in a single layer to provide a smooth outer surface for the sheeting. The coatings are then cured in an oven at a temperature of between about 300 and about 400° C. for a time of between about 40 and about 60 seconds. The peak metal temperature for this curing process is about 232° C. The coatings are then cooled with air and water. A protective film is then applied to the topside of the metal sheet over the finishing layer. The protective film can be applied using an acrylic adhesive and pressed on with nip rollers or it can be a self adhesive protective film. Finally, the pretreated metal sheet is coiled on a metal sheet supply roller.

Lamination Process

A fibrous web is unrolled from a fibrous web supply roller. The fibrous web is then saturated with a resin. The saturation process can include rolling the fibrous web through the resin, spraying, spreading, or pouring the resin. Preferably, the fibrous web is rolled through the resin. A pretreated metal sheet is unrolled from a metal sheet supply roller. The maximum line speed for unrolling the pretreated metal sheet is about 20 m/min. A transport foil is applied to the pretreated metal sheet to protect the finishing layer from styrene in the resin. The transport foil can be a poly(ethylene terephthalate) or PET layer with a thickness of between about 100 and about 200 μm. The transport foil can be applied by rolling the pretreated metal sheet with topside down over a sheet of PET and taping the sheet of PET to the sides of the pretreated metal sheet. A layer of resin is then applied to the backside of the pretreated metal sheet layer over the interlayer adhesion layer. This application process can include spreading the resin with a blade, spraying the resin, or roll coating the resin. Preferably, the resin is applied with a blade.

The saturated fibrous web and the pretreated metal sheet are then joined together. A top foil is then applied to the exposed surface of the saturated fibrous web. The top foil can be a PET layer with a thickness of about 25 μm. The top foil can be applied by a set of nip rollers. The top foil functions to reduce styrene emissions during the subsequent curing step.

The resin is then cured in a curing process. The curing process depends on the type of resin and the type of curing agent used. The curing process may comprise a heating process or a UV curing process. Preferably the curing process is a heating process. The heating process may comprise heating the resin on heated table, IR heating systems, or microwave heating systems. Preferably, the heating process comprises a heated table heated by hot water. The sheeting may be heated in 6 zones. The temperature of the first three zones may be around 100° C. and the remaining zones may be maintained at 90, 80, and 70° C., respectively, to slowly cool down the resin. The length of the 6 zones may be around 40 meters.

The transport and top foil are then removed, recoiled, and discarded. The sides of the sheeting may be removed by sawing away approximately 30 mm from each side to provide a sheeting of the desired width. The sheeting is then coiled and readied for transport. The sheeting may optionally be cut to length and a specified width to provide sheeting portions of a desired length and width.

Lamination Apparatus

The lamination process will now be described in detail by referring to FIG. 2 which schematically shows an exemplary embodiment of an apparatus for performing the lamination process. The apparatus comprises a rotatable fibrous web supply roller 14, onto which the fibrous web 10 has been wound. Downstream of the fibrous web supply roller 14, a resin reservoir 15 is disposed. During use, this reservoir 15 is filled with curable resin. The apparatus is provided with a web guide comprising guiding rollers 16 for feeding the fibrous web 10 from the fibrous web supply roller 14 through the resin reservoir 15 for the purpose of saturating the web 10 with the resin present in the reservoir 15. The apparatus is further provided with gripping rollers 20 which discharge the web 10 from the resin reservoir 15 to a downstream arranged feed-through roller 21.

The apparatus further comprises a rotatable metal sheet supply roller 13 onto which the pretreated metal sheet 11 has been wound. The metal sheet supply roller 13 serves for a continuous supply of the pretreated metal sheet 11 to the saturated fibrous web 10, proceeding along the feed-through roller 21.

Application means 17, 19 are disposed downstream of the feed-through roller 21. In the present exemplary embodiment, the application means comprise a press-on table 19 which is provided with one or more press-on rollers 17. The press-on rollers 17 are designed for pressing the metal sheet 11 supplied thereto from the feed-through roller 21 and the fibrous web 10 onto each other, for forming the sheeting 7 and for leveling the fibrous web 10 and the resin. Downstream of the press-on table 19, a curing device in the form of a heated curing table 18 is disposed for curing the resin of the sheeting 7 which comes from the press-on rollers 17. Downstream of the heated curing table 18, the apparatus is provided with a rotatable discharge roller 12 for winding up the sheeting 7 for storage and transport.

Figure 2:
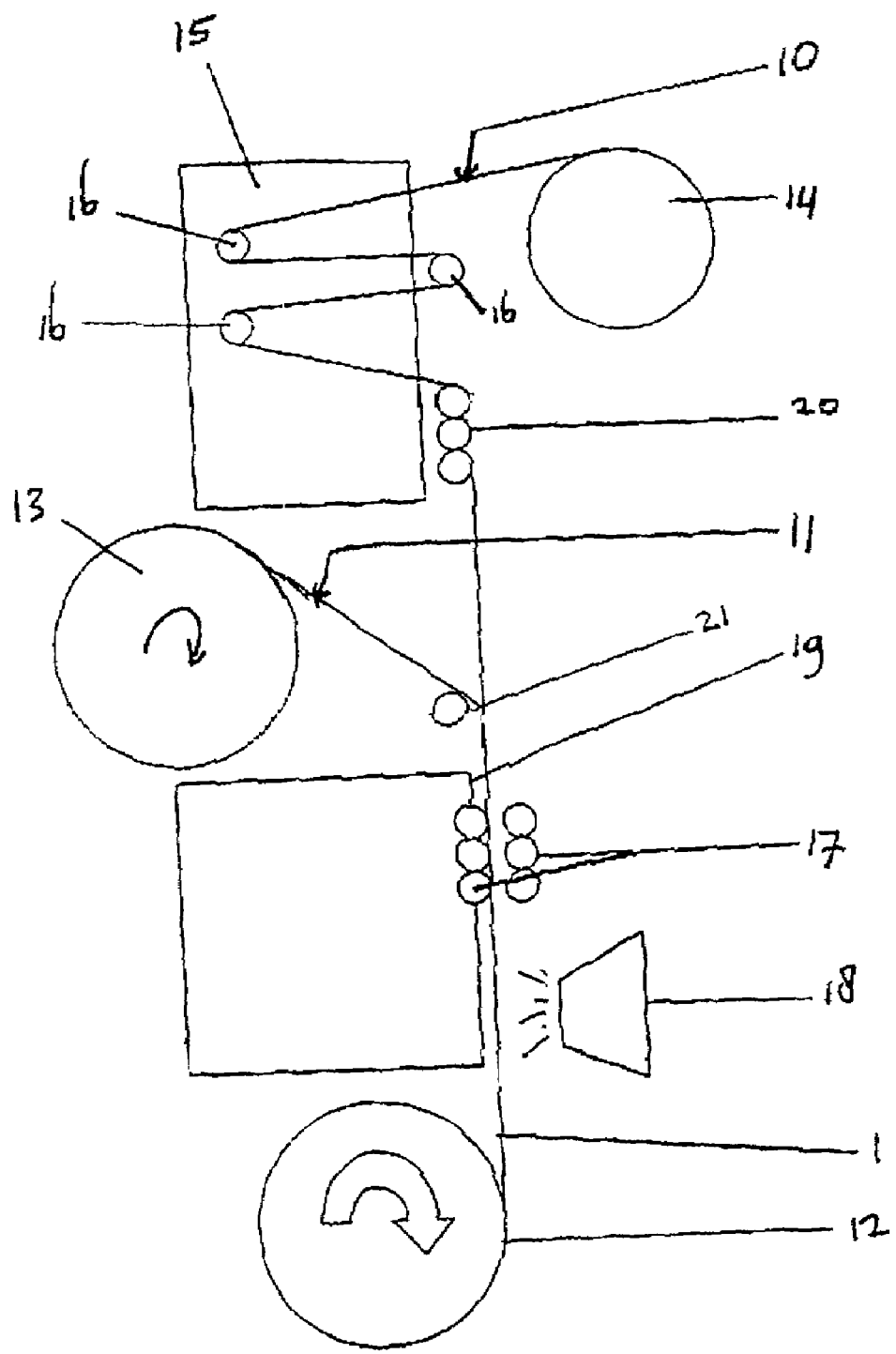
FIG. 2 depicts an apparatus for carrying out the lamination process used for manufacturing the sheeting represented in FIG. 1.

During use of the apparatus represented in FIG. 2, the fibrous web 10 is fed by the fibrous web supply roller 14 to the guiding roller 16, for immersion in the resin in the resin reservoir 15. After the fibrous web 10 has been saturated with resin in the resin reservoir 15, the web 10 is fed along the gripping rollers 20 and via the feed-through roller 21 to the press-on table 19. At the feed-through roller 21, the pretreated metal sheet 11, coming from the metal sheet supply roller 13, is added to a side of the saturated fibrous web 10 with the interlayer adhesion layer on the backside of the metal sheet contacting the saturated fibrous web. Thereupon, the pretreated metal sheet 11 and the saturated fibrous web 10 are pressed together by the press-on rollers 17 for the purpose of adhering the fibrous web 10 to the pretreated metal sheet 11. Further, the press-on rollers 17 effect a leveling of the fibrous web 10 and the resin. Then, the resin is completely cured by the heated curing table 18. Finally, the thus formed sheeting 7 is wound onto the discharge roller 12.

The apparatus depicted in FIG. 2 is for manufacturing the sheeting embodiment of the invention with only one fibrous web. For sheeting with more than one fibrous web, a similar apparatus and method is used. The apparatus includes more than one fibrous web supply rollers, one roller for each web applied. The apparatus may also include a separate resin reservoir for each web or the webs can be rolled through the same resin reservoir. The apparatus may also contain separate guiding rollers 16 and gripping rollers 20 for each fibrous web. To manufacture the sheeting, the method is identical to the one fibrous web embodiment up to the step of the metal sheet and resin saturated fibrous web meeting at feed-through roller 21. For this embodiment, a second fibrous web is rolled through a resin reservoir using guiding rollers 16 and the second resin saturated fibrous web is discharged from the resin reservoir by gripping rollers 20. Of course, the resin could also be applied to the second fibrous web by spraying, spreading, or pouring the resin. The second saturated fibrous web is then applied to the exposed side of the first saturated fibrous web. This process is repeated for the number of fibrous webs used. The metal sheet and saturated fibrous webs are then are pressed together by the press-on rollers 17 for the purpose of adhering the fibrous webs 10 to the pretreated metal sheet 11. Further, the press-on rollers 17 effect a leveling of the fibrous webs 10 and the resin. Then, the resin is completely cured by the heated curing table 18. Finally, the thus formed sheeting 7 is wound onto the discharge roller 12.

The apparatus shown in FIG. 2 is purely pictorial and is provided only for general understanding of the method of the present invention. The number and size of the rollers shown and the position of the components of the apparatus is not meant to be limiting or to be an accurate portrayal of the apparatus actually used to manufacture the sheeting.

Since the sheeting of the present invention contains only one metal sheet it is relatively light and inexpensive. Further, by using aluminum as the one metal sheet, the cost and weight of the sheeting are kept low. Preferably, the thickness of the metal layer is in the range of 0.4–0.6 mm, so that the sheeting contains relatively little metal and, therefore is relatively inexpensive and light. The at least one fiber reinforced plastic layer can also be designed so as to be relatively light and, for instance, have a mass in the range of 0.8–1.5 kg/m². Moreover, the sheeting can be manufactured relatively rapidly in a continuous process. The sheeting is especially designed for use in applications requiring lightweight materials especially finish for vehicles, trailers, caravans, and buildings.

The sheeting manufactured with this method has an outside surface which is relatively insusceptible to denting and scratching. Consequently, impact by hard objects on the outside surface causes virtually no or hardly any visible damage to the sheeting. Therefore, the sheeting can preserve a desired surface smoothness provided by the one metal layer.

Further, the sheeting manufactured by the method of this invention can relatively easily be recycled. To this end, different methods can be used, such as shredding and melting the sheeting. In addition, the sheeting can be subjected to pyrolysis, whereby the material is cooled such that the at least one fiber reinforced plastic layer detaches from the metal layer. Further, the sheeting can relatively easily be ground and then be separated in a cyclone separator according to material.

Further the method used to manufacture the sheeting includes a pretreatment process. The pretreatment process includes degreasing a metal sheet and applying a barrier layer to both sides of the metal sheet, a finishing layer to the topside of the metal sheet, and an interlayer adhesion layer to the backside of the metal sheet. The finishing layer and the interlayer adhesion layer are subsequently cured. A protective film is then applied to the topside of the metal sheet over the finishing layer. The barrier layer serves to protect the metal sheet from corrosion. It also serves to improve the adherence between the metal sheet and the finishing layer on the topside and between the metal sheet and the interlayer adhesion layer on the backside. The finishing layer serves to provide the sheeting with a smooth, dent and scratch resistant, anti-corrosive, and high gloss finish. The finishing layer can also provide the exterior of the sheeting with a desired color or design. The interlayer adhesion layer serves to improve the adherence between the metal sheet and the fiber reinforced layer. The protective film serves to protect the finishing layer from damage during lamination, coiling, transport, and installation. As such, the sheeting of the present invention exhibits enhanced adherence between the layers especially between the metal sheet and fiber reinforced layer. Also the sheeting is protected from scratching, denting, and corrosion.

Although particular embodiments of this invention have been disclosed herein for purposes of explanation, further modifications or variations thereof will be apparent to those skilled in the art to which this invention pertains. For example, other materials could be used for the various layers and different process conditions could be used in the method of the present invention. Further, the terms "backside" and "topside" used throughout this specification and appended claims are used only to differentiate the two sides of a metal sheet. The terminology is meant in no way to limit invention. Thus, the scope of the present invention is only limited by the appended claims.

What is claimed is:

1. A method for forming a dent resistant sheeting, said method comprising:
    a continuous pretreatment process comprising:
        degreasing a topside and a backside of a metal sheet;
        applying a barrier layer to both sides of the degreased metal sheet;
        applying a finishing layer over the barrier layer on the topside of the metal sheet;
        applying an interlayer adhesion layer over the barrier layer on the backside of the metal sheet;
        curing the finishing layer and the interlayer adhesion layer;
        applying a protective film to the topside of the metal sheet over the cured finishing layer to form a pretreated metal sheet;
        coiling the pretreated metal sheet on a metal sheet supply roller; and
    a continuous lamination process comprising:
        unrolling the pretreated metal sheet from the metal sheet supply roller;
        unrolling at least one glass fibrous web from a glass fibrous web supply roller;
        saturating the at least one glass fibrous web with a resin to form at least one saturated glass fibrous web;
        applying the at least one saturated glass fibrous web to the backside of the pretreated metal sheet;
        forcing the at least one saturated glass fibrous web and the pretreated metal sheet together, and
        curing the resin to form a sheeting comprising at least one fiber reinforced plastic layer and only one metal sheet.

2. The method of claim 1, wherein the continuous lamination process further comprises applying a resin to the backside of the pretreated metal sheet between the steps of unrolling the pretreated metal sheet and applying the at least one saturated glass fibrous web to the backside of the pretreated metal sheet.

3. The method of claim 1, wherein the continuous lamination process further comprises:
    applying a transport foil to protect the topside of the pretreated metal sheet; and coiling the dent resistant sheeting,
    wherein the transport foil is applied after the step of unrolling the pretreated metal sheet and before the step of applying the at least one saturated glass fibrous web to the backside of the pretreated metal sheet and wherein the transport foil is removed after the curing step and before the coiling step.

4. The method of claim 3, wherein the continuous lamination process further comprises applying a top foil over the saturated glass fibrous web wherein the top foil is applied after the step of applying the least one saturated glass fibrous web to the resin coated side of the pretreated metal sheet and before the curing step and wherein the transport foil is removed after the curing step and before the coiling step.

5. The method of claim 1, wherein the degreasing step comprises treating the metal sheet with an acid spray system.

6. The method of claim 1, wherein the step of applying the barrier layer comprises roll coating.

7. The method of claim 1, wherein the finishing layer and the interlayer adhesion layer are both applied by one of the processes selected from the group consisting of roll coating, spraying, and powder coating.

8. The method of claim 7, wherein the finishing layer and the interlayer adhesion layer are both applied by roll coating.

9. The method of claim 1, wherein the pretreatment curing step comprises heating the metal sheet in an oven for about 40 to about 60 seconds.

10. The method of claim 1, wherein the pretreated metal sheet is unrolled from the metal sheet supply roller at a speed of less than 20 meters per minute.

11. The method of claim 1, wherein the saturating step comprises rolling the at least one fibrous web through a resin reservoir.

12. The method of claim 11, wherein more than one glass fibrous web is unrolled, saturated, and applied to the backside of the pretreated metal sheet.

13. The method of claim 1, wherein the lamination curing step comprises a multi-zone heating process.

* * * * *